United States Patent

Bicking

[15] 3,667,013

[45] May 30, 1972

[54] HYSTERESIS MOTOR CONTROL CIRCUIT APPARATUS

[72] Inventor: Robert E. Bicking, Anoka, Minn.
[73] Assignee: Honeywell Inc., Minneapolis, Minn.
[22] Filed: Sept. 25, 1970
[21] Appl. No.: 75,617

[52] U.S. Cl..............................318/166, 318/178, 318/189
[51] Int. Cl........................................H02k 19/08, H02p 5/28
[58] Field of Search...................318/166, 178, 179, 189, 230

[56] References Cited

UNITED STATES PATENTS 3,463,986   8/1969   Curriston et al.......................318/166

Primary Examiner—Gene Z. Rubinson
Attorney—Charles J. Ungemach, Ronald T. Reiling and Albin Medved

[57] ABSTRACT

A power supply for use with hysteresis motors to provide a low power mode of operation. A current detector measures the level of current in hysteresis motor windings. The detector drives an oscillator which controls the voltage applied to the motor to maintain permanent magnetization of the rotor.

4 Claims, 4 Drawing Figures

INVENTOR.
ROBERT E. BICKING

Patented May 30, 1972

INVENTOR.
ROBERT E. BICKING
BY Ronald T. Reiling
ATTORNEY

HYSTERESIS MOTOR CONTROL CIRCUIT APPARATUS

The invention herein described was made in the course of or under a contract or subcontract thereunder with the United States Air Force.

BACKGROUND OF THE INVENTION

This invention pertains to a power supply for hysteresis motors, more particularly, a circuit which maintains the rotor of hysteresis motors in a continuous, permanently magnetized state.

The use of overmagnetization of the rotors of hysteresis motors is known in the art and the concept of overmagnetizing hysteresis motors to improve the power factor and reduce the power required to drive the motors is described in an article by H. C. Roters entitled "The Hysteresis Motor-- Advances Which Permit Economical Fractional Horsepower Ratings," *Transactions of the American Institute of Electrical Engineers*, Volume 66, pages 1,419 through 1,430, 1947.

A hysteresis motor in synchronism has a rotating field set up by its stator windings which in turn sets up a magnetic path in the rotor. These are in time synchronism. The rotor is constructed of permanent magnet material. During each cycle of the motor rotor, magnetizing current must ordinarily be supplied. However, if the rotor is overmagnetized by applying a greater than normal voltage to the motor after it reaches synchronism, then the voltage necessary to drive the motor is reduced to a lower level and magnetizing current is no longer required. This is true because the rotor is in a state of permanent magnetization.

Applicant's invention fills the need for an automatic means of maintaining the overmagnetized state of the rotor in hysteresis motors, thereby enabling the concept described above to be practically applied.

It is not acceptable merely to overmagnetize the rotor at the start of its operation since various conditions can cause demagnetization of the rotor and a higher current drain during its operation. Typical of these conditions which cause demagnetization are power failure and physical vibration of the motor itself.

It is therefore one object of the present invention to provide a power supply for hysteresis motors which provides an overmagnetizing voltage during the start mode and continually senses motor current providing overmagnetization voltage whenever necessary to maintain the overmagnetized state of the rotor.

SUMMARY OF THE INVENTION

In accordance with the invention, this object is attained by using a means for detecting the magnetization state of motor rotor elements, and providing an output indicative of the magnetization state. An oscillator whose input is connected to the detection means output responds to the detection means to generate pulses at its output whenever a demagnetization of the rotor is detected. The oscillator output is connected to a means for sensing pulses which responds to the oscillator pulses to provide increased AC voltage at its output, thus providing a voltage sufficient to re-establish permanent magnetization of a hysteresis motor rotor. In this manner, constant sensing of the current level at the hysteresis motor is provided and continuous and automatic control of the magnetization state of the hysteresis motor is maintained.

BRIEF DESCRIPTION OF THE DRAWINGS

Other objects and advantages of the invention will become apparent upon reading the following detailed description and upon reference to the drawings, in which.

While the invention will be described in connection with a preferred embodiment, it will be understood that it is not intended to limit the invention to that embodiment. On the contrary, it is intended that all alternatives, modifications and equivalents included within the spirit and scope of the invention as defined by the appended claims will be covered.

DETAILED DESCRIPTION OF THE INVENTION

Figure 1:
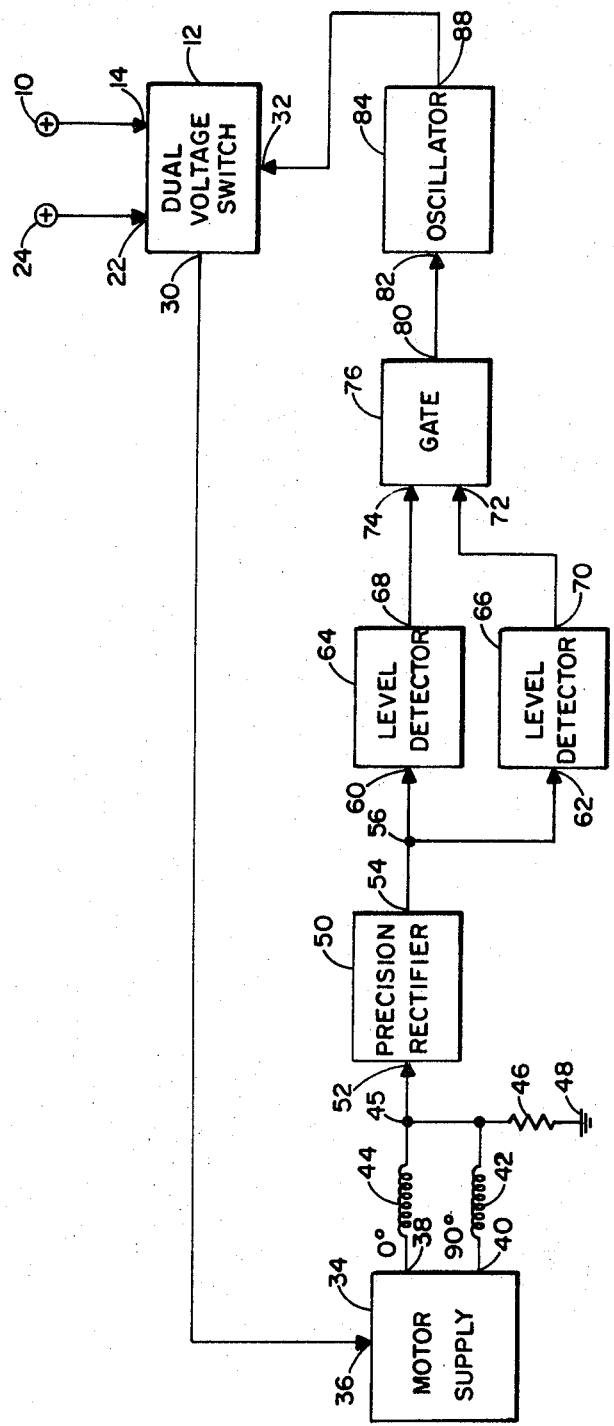
FIG. 1 is a block diagram depicting major elements of the motor control circuit apparatus.

Turning first to FIG. 1, there is shown a first DC power source 10 connected to a dual voltage switch 12 at one input terminal 14. Connected to a second input terminal 22 of the switch 12 is a second DC power source 24 which provides a lower voltage than that supplied by source 10. The switch 12 has an output terminal 30 and a gate terminal 32. Input terminal 22 is normally connected to output terminal 30. Application of pulses at the gate terminal 32 causes the switch 12 to open that connection and to provide the signal applied to terminal 14 at the output 30.

The output terminal 30 is coupled to the motor supply 34 at the DC power input 36. The motor supply 34 has output terminals 38 and 40 which are connected to the hysteresis motor coils 44 and 42 respectively. The motor supply provides at output terminals 38 and 40 two AC voltages separated by 90° in phase. The coils of the hysteresis motor use this rotating field to create a torque in the rotor of the motor.

The hysteresis motor coils 42 and 44 are connected to output terminals 38 and 40 and at a common point 45. A current sensing resistor 46 is connected between common point 45 and ground 48. This current sensing resistor 46 at all times carries a voltage indicative of the current drawn by the motor coils.

Although a current sensing resistor is disclosed as one means of sensing the motor coil current and thereby determining the magnetization state of the rotor, other means of sensing rotor demagnetization could be used. For example, a temperature sensor such as a platinum wire resistance sensor could be used to sense changes in motor coil temperature which would accompany increased motor current.

The common point 45 is connected to a precision rectifier 50 through an input terminal 52. Thus, an indication of the current drawn by the motor coils is provided to a precision rectifier 50. The rectifier 50 rectifies the AC signal and provides at an output 54 an indication of the current drawn by the coils 42 and 44.

Connected to output 54 of precision rectifier 50 is a common point 56 which is further connected to the input terminals 60 and 62 of two level detectors 64 and 66. Although two level detectors are shown in FIG. 1, the system may be satisfactorily operated with only one level detector. This detector would be adjusted to sense increases in DC voltage above the range present when the rotor is permanently magnetized. The second detector could be used to sense DC voltage below the normal range, which would provide power failure indication. The level detectors 64 and 66 have output terminals 68 and 70. The level detectors 64 and 66 are adapted to sense particular voltage levels provided at their input terminals. The level detectors provide positive logic signals at their output terminals during normal operation, and zero level signals when tripped by abnormal voltage inputs.

The output terminals 68 and 70 are connected to input terminals 72 and 74 of logic gate 76. The logic gate 76 is an AND gate which senses the presence of positive logic signals at its input terminals 72 and 74 and provides a positive logic signal at its output 80 only if positive signals are present at both terminals 72 and 74.

The output of gate 76 is connected to input terminal 82 of an oscillator 84. The oscillator 84 provides a pulsed output at its output terminal 88 only in the presence of a zero level logic signal at its input 82. The output 88 of oscillator 84 is connected to the gate terminal 32 of the dual voltage switch 12. The pulses from the oscillator 84 when fed to the gate 32 cause switching of the dual voltage switch 12.

During operation of the system shown in FIG. 1, the current sensing resistor 46 provides at common point 45 an AC voltage indicative of the current drawn by the motor coils 42 and 44. This AC signal is transmitted to the rectifier 50 where it is amplified and rectified to a DC voltage level. The output of the rectifier is then fed to one or more voltage level detectors at least one of which is set to sense abnormally high voltage levels indicative of demagnetization of the rotor. The other level detector, if present, must be set to provide a positive logic signal in its untripped state. When an abnormally high voltage level is detected, level detector 64 transmits a zero level logic signal to the gate 76 causing the gate 76 to trip and transmit a zero level logic signal to the oscillator 84. The oscillator 84 is enabled by this zero level logic signal and transmits output pulses which cause switching of the dual voltage switch 12.

Since the oscillator 84 provides pulses to the dual voltage switch 12, pulsed changes in the voltage provided at the output of the dual voltage switch will occur. This means that only short pulses of the high overmagnetization voltage will be provided to the motor supply 34. Since the current drawn by the coils 42 and 44 is constantly being monitored by the level detectors, when a sufficient number of pulses of overmagnetization voltage have occurred so that the rotor is again permanently magnetized, the level detector adapted to sense high voltage levels will no longer transmit a zero level logic signal.

The AND gate 76 will again have two positive inputs, thus a positive level output and will no longer drive the oscillator circuit 84. Thus the dual voltage switch will pass only the lower of the two DC voltages supplied to it while permanent magnetization of the hysteresis motor rotor continues.

Thus it is apparent that there has been provided, in accordance with the invention, a hysteresis motor control circuit that automatically provides overmagnetization voltage for its rotor, resulting in substantial power savings.

Figure 2:
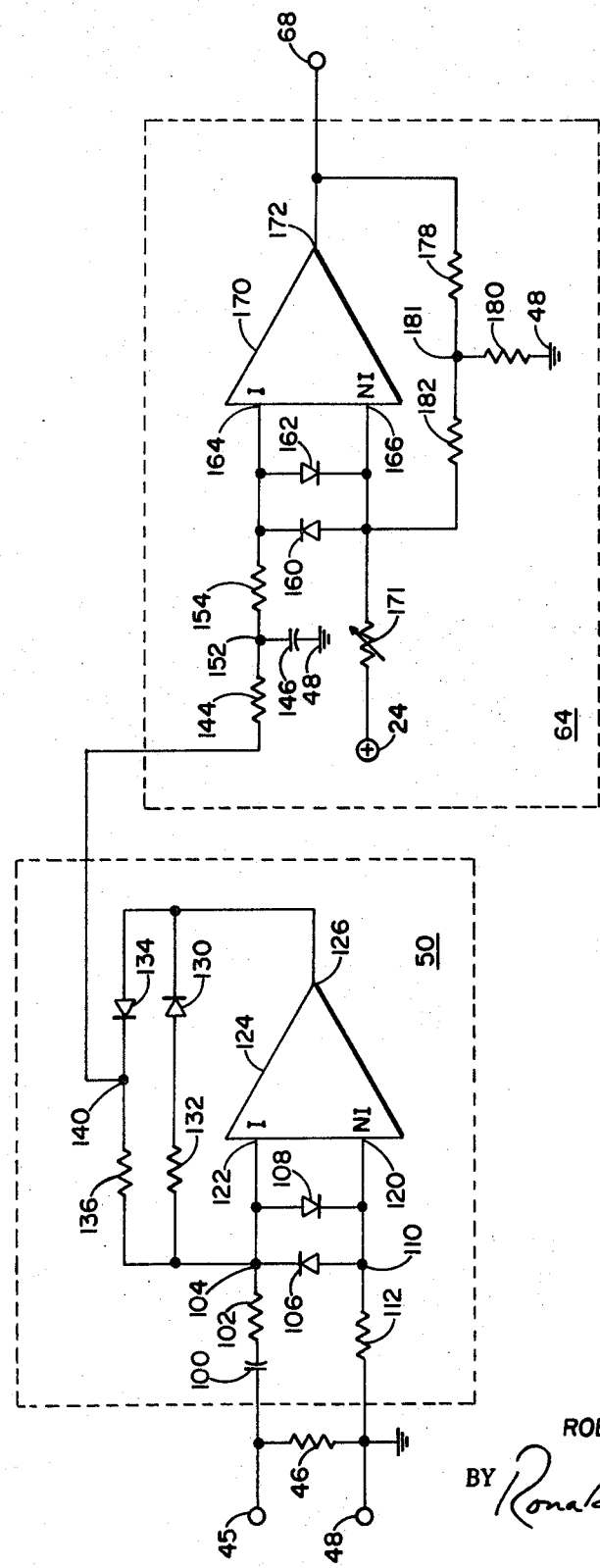
FIG. 2 is a detailed circuit diagram of embodiments of a precision rectifier and a current level detector suitable for use in the motor control circuit.

Referring now to FIG. 2, there is shown a specific embodiment of a precision rectifier and level detector suitable for use in the applicant's invention. The current sensing resistor 46 previously shown in FIG. 1 is again shown, with one end connected through the series combination of a capacitor 100 and resistor 102 to a common point 104. Also connected to the common point 104 is the cathode of a diode 106 and the anode of a second diode 108. The anode of diode 106 and the cathode of diode 108 are connected to a common point 110, which in turn is connected through a biasing resistor 112 to ground 48.

Common points 110 and 104 are respectively connected to non-inverting input 120 and inverting input 122 of an operational amplifier 124. The operational amplifier 124 has an output 126 which is coupled to the series combination of diode 130 and resistor 132 in parallel with the series combination of diode 134 and resistor 136. These two legs form a feedback path connected to a common point 104. A pickoff point 140 is placed between the resistor 136 and the diode 134.

This entire structure is shown in FIG. 2 in a dashed line box designated 50 which identifies it as a precision rectifier. It functions to amplify and rectify the AC voltage signals which appear at the current sensing resistor 46. The capacitor 100 and resistor 102 AC-couple the signal from the resistor 46 to the operational amplifier 124. The resistor 112 sets the reference voltage level of the amplifier. The diodes 130 and 134 in the amplifier feedback path act to half wave rectify the output. The half wave rectified output is picked off at the terminal point 140 for transmission to the level detector shown in the dashed line box designated 64.

The common point 140 is connected to the resistor 144 which is in turn coupled to ground 48 through a capacitor 146. A junction point 152 is located between the resistor 144 and capacitor 146 and one end of a resistor 154. The other end of resistor 154 is connected to a cathode of a diode 160 and the anode of a diode 162 and to the inverting input terminal 164. The anode of diode 160 and the cathode of diode 162 are connected in common to the non-inverting input 166 of the operational amplifier 170. Also connected to the non-inverting input 166 is a positive power source 24. Power source 24 is connected to the non-inverting input 166 through a variable resistor 171.

The output 172 of the operational amplifier 170 is connected through a resistor 178 and resistor 180 to ground 48. A junction point 181 between resistors 178 and 180 serves as a connection to resistor 182, the other end of which is connected to the anode of diode 160. The resistors 178 and 182 form the feedback path for the operational amplifier 170 and the resistors 171, 182 and 180 act as a voltage divider which biases the non-inverting input terminal of the amplifier.

The level detector circuit described above is shown in a dashed line box 64. In operation, the detector 64 receives the half wave-rectified input present at common point 140 and filters the input through the combination of the resistor 144 and capacitor 146. This filtered input is then presented through the resistor 154 to the inverting input 164 of the amplifier 170. It is there compared with the voltage level maintained at non-inverting input 166 by the DC voltage source 24 and the voltage divider made up of the resistors 171, 182 and 180. As is shown in the drawing, the resistor 171 is made adjustable so that the threshold or tripping level of the level detector may be readily altered.

When the DC voltage at the inverting input terminal 164 exceeds that established by the DC source 24 and the voltage divider at the non-inverting input 166, a low or zero level voltage will be transmitted at the output 172 to the output terminal 68. If the resistor 171 has been properly adjusted the level detector generally designated 64 will provide a zero lever logic signal each time the motor rotor suffers demagnetization.

Figure 3:
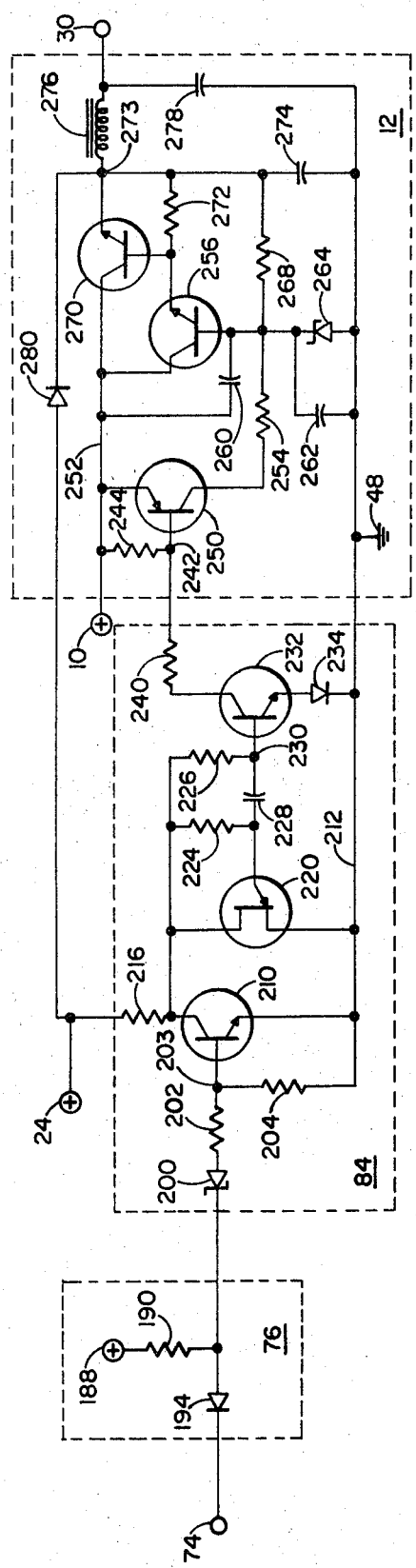
FIG. 3 is a detailed circuit diagram of a gate, oscillator circuit, and dual voltage switch used in one embodiment of the motor control circuit.

FIG. 3 shows specific embodiments of a logic gate, oscillator circuit, and dual voltage switch adapted to be used with the apparatus of FIG. 2. Referring now to FIG. 3, an input terminal 74 to a logic gate in a dashed line box generally designated 76 is pictured. As previously shown in FIG. 1, the logic gate 76 is connected to receive the output signal from level detector output terminal 68. Shown in the dashed line box 76 is a DC power source 188 connected to a resistor 190. The resistor 190 is further connected to the anode of a diode 194, the cathode of which is connected to input terminal 74. The anode of diode 194 is further coupled to the cathode of the zener diode 200.

This gate will be familiar to those skilled in the art as a diode-resistor gate configuration and its operation will not be discussed in detail. It is sufficient to say that the absence of a positive logic signal at the input terminal 74 will cause a low level voltage to be fed to zener diode 200.

Shown in the dashed line box 84 is a unijunction oscillator circuit suitable for use as an oscillator in the hysteresis motor control circuit. A zener diode 200 is shown with its anode connected to one end of a resistor 202, the other end of which is connected to a common point 203. Common point 203 is connected to a resistor 204, which is connected in parallel with the base-emitter junction of a transistor 210. The emitter of transistor 210 and one end of resistor 204 are connected to a common lead 212. Power to drive transistor 210 is provided by a power source 24 connected in series with a resistor 216 to the collector of the transistor 210. Also connected to the collector of the transistor 210 is a first base terminal of a unifunction transistor 220 the other base terminal of which is connected to the common lead 212. Connected between the first base terminal of the unifunction transistor 220 and the emitter terminal are two resistors 224 and 226. Connected between one end of each of these two resistors is a capacitor 228. One end of capacitor 228 and one end of resistor 226 are connected to a junction point 230 which is in turn coupled to the base of a transistor 232. The emitter of transistor 232 is connected through a diode 234 to the common lead 212. Connected to the collector of transistor 232 is a resistor 240 which is further connected to the junction point 242. This completes the structure necessary for the unijunction oscillator circuit.

The unijunction oscillator circuit operation occurs in the following manner: The zener diode 200 provides a protective threshold for the transistor 210. When the signal at input 74 to the gate 76 goes toward ground, transistor 210 loses its base drive. The transistor 210 is then turned off. This causes the collector voltage of transistor 210 to rise to a value approximating the supply voltage 24. Current flow through resistor 226 turns on transistor 232. Current flow through resistor 224 charges capacitor 228. The emitter voltage of unijunction transistor 220 increases until it reaches a level necessary to cause the unijunction transistor 220 to turn on. This voltage is a function of the particular unijunction selected and is unimportant to the operation of the circuit. When the unijunction turns on, the impedance from its emitter to ground becomes very small and since the voltage across capacitor 228 cannot change instantaneously, this causes the base terminal of transistor 232 to be biased negatively with respect to ground. This turns off transistor 232. Thus, the time duration that transistor 232 is turned on is set by the charging time constant of resistor 224 and capacitor 228 and the time duration that transistor 232 is turned off is set by the discharging time constant of the series combination of resistors 224 and 226 and capacitor 228.

The next element in the system which will be described is the dual voltage switch. In the dual voltage switch, a first junction point 242 receiving the signal from the oscillator 84 is connected to the resistor 244 which is in turn connected to a positive DC voltage source 10. Also connected to common point 242 is a base of a transistor 250 whose emitter is connected to a common lead 252. Connected to the collector of transistor 250 is a resistor 254 which is further connected to the base of a transistor 256. Connected between the base and the collector of the transistor 256 is a capacitor 260. The collector of transistor 256 and one end of capacitor 260 are connected to common lead 252. A capacitor 262 is connected between the base of transistor 256 and the common lead 212. Connected in parallel with the capacitor 262 is a zener diode 264. Transistor 256 is one transistor of a Darlington pair which also contains transistor 270. Transistor 270 has its base connected to the emitter lead of transistor 256 and its collector lead connected to the collector lead of transistor 256. Providing bias for transistor 270 is a resistor 272 connected between the base and the emitter of the transistor 270. Common to one end of the resistor 272 and the emitter of transistor 270 is a junction point 273. Also connected to junction point 273 is a capacitor 274 the other end of which is tied to the common lead 212. Common lead 212 is tied to a ground terminal 48. Junction point 273 is also connected to one end of an inductor 276 which is connected in series with a capacitor 278 between point 273 and the common lead 212, thereby forming a filter circuit. Finally, a diode 280 is connected between the DC power source 24 and the junction point 273. One end of inductor 276 is further connected to the output 30 of the dual voltage switch 12.

During operation, transistor 232 of oscillator 84 turns on for short periods of time. Conduction across transistor 232 provides a low resistance path to ground for the power source 10, and biasing voltage is established across resistor 244. This bias voltage turns on the transistor 250 which in turn biases transistor 256 turning it on. Transistor 256, being Darlington connected to transistor 270, brings transistor 270 into conduction, with its output voltage determined by zener diode 264. As the voltage from source 10 is greater than that from source 24, the diode 280 becomes reverse biased and no power from source 10 is transmitted. The conduction of transistor 256 establishes a voltage level across the zener diode 264 and charges up the capacitor 262.

When the transistor 232 turns off, the capacitor 262, having a high resistance discharge path, slowly discharges. Thus the transistor 270 becomes non-conductive gradually. During the period of time in which the transistor 270 is conductive, the voltage established by the power source 10 is transmitted in a filtered and regulated manner to the output terminal 30 for transmission to the motor supply. When transistor 250 turns off and, after capacitive discharge of element 262 the transistor 270 turns off, the power source 24 conducts through the diode 280 and provides a lower voltage at the output terminal 30. In this manner, pulses of varying voltage are provided for use by the motor supply.

Although a particular embodiment of the dual voltage switch has been described, practically any switch which is the functional equivalent of that described in detail could be used. It is particularly important, however, that the switching be sufficiently gradual to avoid inductive surges in the motor which would otherwise reduce the magnetization. One possible embodiment might include a sensitive relay with the power sources connected to its input terminals, its coil energized by pulses from the oscillator circuit 84, and a capacitor between its output terminal and ground to provide gradual switching.

Figure 4:
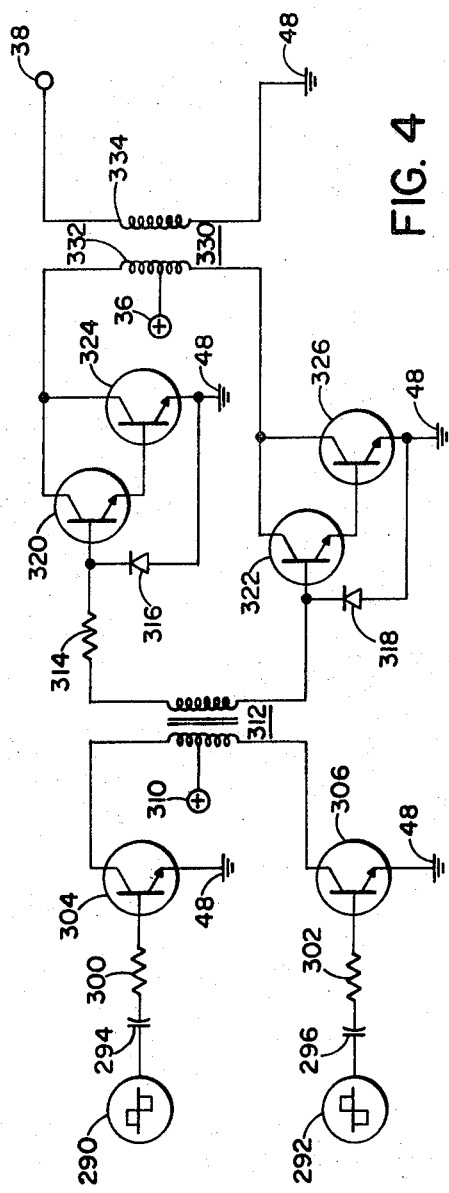
FIG. 4 is a detailed circuit diagram of one possible embodiment of motor supply.

Referring now to FIG. 4, there is shown one half of a system for the motor supply generally designated in FIG. 1. The other half of the system would be identical except that the AC sources would be 90° separated in phase from those shown in FIG. 4. Shown in FIG. 4 are two low level, square wave sources 290 and 292 separated 180° in phase. These sources feed two legs of a push-pull amplifier made up of capacitors 294 and 296, resistors 300 and 302, two transistors 304 and 306 and the primary of a transformer 312 together with a positive DC source 310 connected to the center tap of the primary of transformer 312. Thus transformer 312 is provided with an AC signal of amplified level at its secondary.

The secondary of the transformer 312 feeds a second push-pull type amplifier made up of a biasing resistor 314, diodes 316 and 318, Darlington-connected transistors 320, 322, 324 and 326 and transformer 330. The primary 332 transformer is a center-tapped primary which may be connected to the output of the dual voltage switch. In this manner, the dual voltage switch provides a DC level which controls the amplitude of the output to the secondary 334. The secondary 334 is then connected to the output terminal 38 which is in turn connected to one of the hysteresis motor coils. In this matter, dual voltage may be provided at the coil.

It will be apparent to those skilled in the art that the invention does not depend upon the use of a push-pull amplifier with the coupling of the DC voltage to a center tapped transformer as is shown in the detailed or preferred embodiment. Any alternative means of supplying an AC signal whose level or amplitude is determined by the DC voltage level at the output of the dual voltage switch would be adequate and satisfactory.

Thus it is apparent that there has been provided, in accordance with the invention, a hysteresis motor control circuit that fully satisfies the objects and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. Apparatus for controlling hysteresis motor rotor magnetization comprising:
   a. a current level detector for detecting the magnetization state of motor rotor elements during motor operation and providing an output indicative of the magnetization state;
   b. an oscillator, having an input and an output, connected to said detector, and responsive thereto to generate pulses at the oscillator output whenever the detector output indicates demagnetization;
   c. a dual voltage switch, connected to said oscillator output and responsive thereto to provide a first DC voltage at its output whenever no oscillator pulses are received, and a second, larger DC voltage when oscillator pulses are received; and d. motor control means, connected to the dual voltage switch output and operable to generate at the motor control means output an AC signal whose amplitude is dependent upon the DC voltage input, whereby the magnetization state of a hysteresis motor connected to the control means output may be controlled.

2. The apparatus of claim 1 wherein the dual voltage switch provides gradual switching between said first and second DC voltage, thereby limiting the inductive surge of a hysteresis motor connected to the control means output during switching.

3. The apparatus of claim 2 wherein said dual voltage switch includes a transistor having a base connected to the parallel combination of a zener diode and a capacitor.

4. The apparatus of claim 2 wherein said current level detector comprises:

a. a current sensing resistor adapted to receive motor coil currents;

b. a first voltage level detector connected to monitor the voltage across said current sensing resistor and provide a logic signal at its output whenever the monitored voltage falls below a predetermined level;

c. a second voltage level detector connected to monitor the voltage across said current sensing resistor and to provide at its output a logic signal whenever the voltage monitored by said second detector is above a predetermined level; and d. a logic gate connected to said first and second current level detectors and providing a logic signal at the logic gate output whenever one of said detectors has a logic signal at its output.

* * * * *